May 20, 1930.            J. LOVE, JR            1,759,653
                   SIEVE OPERATING MECHANISM
                       Filed Jan. 24, 1929
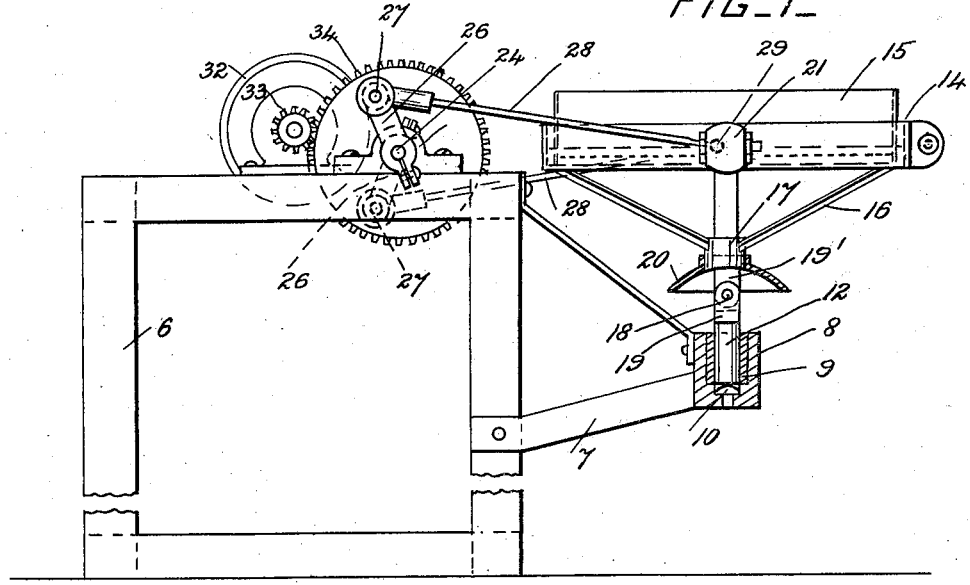
FIG_1_
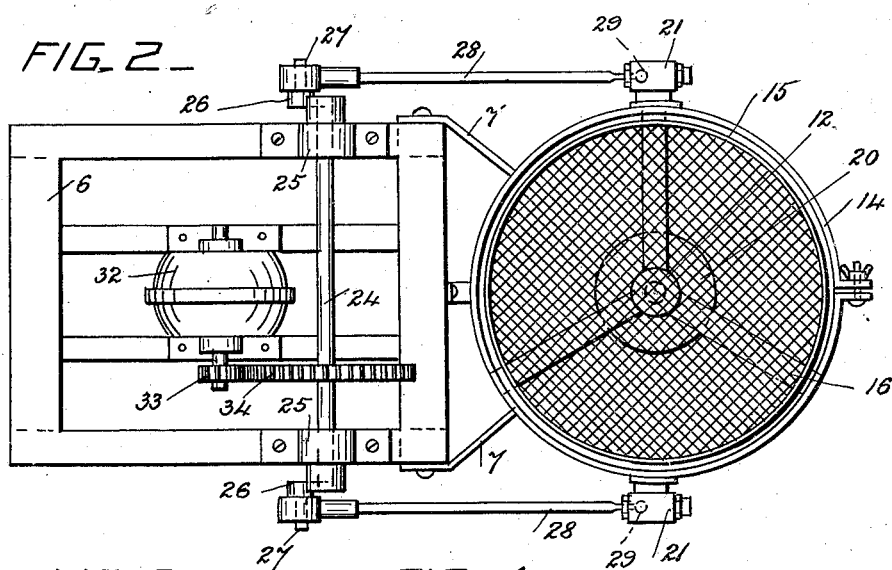
FIG_2_
FIG_3_     FIG_4_
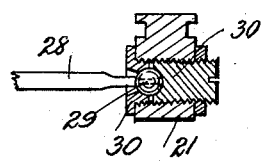 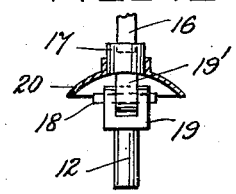
Inventor
James Love, Jr.
by Herbert W. T. Jenner
       Attorney.

Patented May 20, 1930

1,759,653

UNITED STATES PATENT OFFICE

JAMES LOVE, JR., OF WILKES-BARRE, PENNSYLVANIA, ASSIGNOR OF ONE-HALF TO THOMAS POWELL, OF WILKES-BARRE, PENNSYLVANIA

SIEVE-OPERATING MECHANISM

Application filed January 24, 1929. Serial No. 334,777.

This invention relates to mechanism for sifting the sand used by molders, and for other similar purposes; and it consists in the novel construction and combination of the parts hereinafter fully described and claimed whereby a suitable compound motion is imparted to the sieve or riddle by means of a motor and intermediate driving mechanism.

In the drawings, Fig. 1 is a side view of a sieve operating mechanism, partially in section, and constructed according to this invention. Fig. 2 is a plan view of the same. Fig. 3 is a detail sectional view of one of the ball bearings. Fig. 4 is a detail front view of the rock-shaft and the hub.

A supporting frame 6 of any approved construction is provided, and has at one side a bracket 7 provided with a vertical bearing 8. This bearing is provided with a liner or bushing 9, and has a step 10 so that the shaft 12 will rock freely. The rock-shaft 12 is mounted in the liner 9, and rests upon the step 10.

A frame 14 is provided for holding a riddle or sieve 15. The riddle or sieve is of the kind suitable for sand, but it may be used for any other material. It is placed in the frame, and may be fastened therein by any approved means. The sieve frame 14 is supported by arms 16 which project from a hub 17, and the hub 17 is connected to the shaft 12 by a horizontal pin 18. The rock-shaft preferably has a double-eye 19 at its top, and the hub has a lug or single-eye 19' which is pivoted in the double-eye. The hub 17 also has a guard plate 20 which is curved downwardly, and which projects over the pivot joint and bearing, and prevents sand from entering them by deflecting it laterally.

The sieve frame 14 has ball bearing members 21 which project from it radially at diametrically opposite points. A driving shaft 24 is journaled in bearings 25 secured to the top of the supporting frame 6. Cranks 26 are secured to the end portions of the driving shaft, and have crank-pins 27.

The two cranks 26 are set at an obtuse angle to each other, one crank being preferably 135 degrees in advance of the other. The crank-pins are connected to the bearings 21 by connecting-rods 28 which have balls 29 which engage with the sockets of the ball bearings. The ball bearings are of any approved construction, and the sockets preferably have screwthreaded portions 30 for engaging with the balls 29 and adjusting the freedom of connection.

The driving shaft is preferably rotated by an electric motor 32 secured to the supporting frame, and provided with a pinion 33 which meshes into a toothed wheel 34 secured on the driving shaft, but any other approved means may be used for rotating the driving shaft. The cranks impart a compound motion to the sieve frame 14 and the riddle or sieve. The sieve is oscillated horizontally on the axis of the rock-shaft 12, and is at the same time tilted and oscillated laterally back and forth on the axis of the pivot pin 18. The lateral tilting and oscillating motion is effected by the action of the two crank-pins 27, which are moved crosswise of the shaft 24 from one side of it, as shown, to the other side of it, the sieve frame and sieve being pivoted on the pin 18 which is arranged at a considerable distance below the sieve. As the cranks are set at angles to each other other than 180 degrees, the movements of the connecting rods are unequal at any stage. This inequality causes one side of the sieve frame to have a greater or less oscillating movement than that of the other which causes the frame and its support to tilt to accommodate the inequality of movement of the connecting rods. This compound motion is found very effective in separating the material placed in the riddle or sieve, so that all the finer particles of it are discharged, and lumps and accumulations of sand are broken up.

The parts of the machine can be variously proportioned, and the sieve can be made to tilt to a greater or less extent in each direction, or to an equal extent in each direction. The machine will work if the cranks are set at a right angle to each other, but it will not work so well. When the cranks are set as shown and described a very satisfactory ratio of tilting motion to oscillating motion is obtained.

What I claim is:

1. In a sieve operating mechanism, a supporting frame, a frame for holding a sieve mounted to oscillate horizontally and tilt laterally on the supporting frame, a driving shaft provided with cranks set at an obtuse angle to each other, and means for connecting the cranks with the sieve frame at opposite sides of its vertical axis.

2. A sieve operating mechanism as set forth in claim 1, the said cranks being connected with the sieve frame by connecting-rods having ball bearings at one end.

3. In a sieve operating mechanism, a supporting frame provided with a vertical bearing at one side, a rock-shaft mounted in the vertical bearing, a tilting frame for holding a sieve connected to the upper end of the rock-shaft by a horizontal pivot, a driving shaft provided with cranks set at an obtuse angle to each other, and means for connecting the cranks with the sieve frame at opposite sides of the axis of its rock-shaft.

4. A sieve operating mechanism as set forth in claim 3, the said tilting frame being provided with arms and a hub having a guard plate which projects over the top of the vertical bearing and deflects the material outwardly which falls through the sieve upon it.

5. A sieve operating mechanism, comprising a supporting frame, a driving shaft journaled therein, a motor secured to the frame, driving wheels connecting the motor with the driving shaft, cranks secured to the driving shaft and set at an obtuse angle to each other, a frame for holding a sieve mounted to oscillate horizontally and tilt laterally on the supporting frame, and means for connecting the cranks with the sieve frame at opposite sides of its vertical axis.

6. In a sieve operating mechanism, a support having a vertical bearing, a rock-shaft mounted in the said bearing, a frame for holding a sieve pivoted to one end of the rock-shaft by a horizontal pivot and free to tilt and oscillate crosswise of the rock-shaft, and driving mechanism operating to rock the rock-shaft and the sieve frame and simultaneously to oscillate and tilt the sieve frame.

7. A sieve operating mechanism as set forth in claim 6, the said driving mechanism comprising a shaft arranged to one side of the sieve frame and provided with cranks set at an angle to each other other than 180 degrees, and means for connecting the said cranks with the sieve frame upon opposite sides thereof.

In testimony whereof I have affixed my signature.

JAMES LOVE, Jr.